United States Patent [19]

Lindig et al.

[11] Patent Number: 4,522,466
[45] Date of Patent: Jun. 11, 1985

[54] RECURSIVE OPTICAL FILTER SYSTEM

[75] Inventors: Charles E. Lindig, Huntington Bay; Robert W. Brandstetter, Levittown; Adrian R. Doucette, Garden City, all of N.Y.

[73] Assignee: Grumman Aerospace Corporation, Bethpage, N.Y.

[21] Appl. No.: 498,462

[22] Filed: May 26, 1983

[51] Int. Cl.³ .......................... G02B 5/22; G06G 9/00
[52] U.S. Cl. .............................. 350/162.12; 364/822
[58] Field of Search ...................... 350/162.12, 162.13, 350/162.14; 364/822, 825

[56] References Cited

U.S. PATENT DOCUMENTS

| | | | |
|---|---|---|---|
| 3,066,576 | 12/1962 | Clorfeine | 350/486 |
| 3,516,727 | 6/1970 | Hickey et al. | 350/160 |
| 3,578,846 | 5/1971 | Chen | 350/162.14 |
| 3,675,985 | 7/1972 | Gloge | 350/157 |
| 3,714,438 | 1/1973 | Hahn et al. | 250/199 |
| 3,962,657 | 6/1976 | Redman et al. | 332/7.51 |
| 4,001,705 | 1/1977 | Sinclair et al. | 330/4.3 |

OTHER PUBLICATIONS

Turpin, T. M., "Spectrum Analysis Using Optical Processing," Proceedings of the IEEE, vol. 69, No. 1, Jan. 1981, pp. 79-92.
Rhodes, W. T., "Acousto-Optic Signal Processing: Convolution and Correlation", Proceedings of the IEEE, vol. 69, No. 1, Jan. 1981, pp. 65-79.
Korpel, A. "Acousto-Optics-A Review of Fundamentals", Proceedings of the IEEE, vol. 69, No. 1, Jan. 1981, pp. 48-53.
Lee, J. N. et al., "High Speed Adaptive Filtering and Reconstruction . . . Using A/O Techniques", IEEE Ultrasonics Conference, 1981.

*Primary Examiner*—Bruce Y. Arnold
*Attorney, Agent, or Firm*—Richard G. Geib

[57] ABSTRACT

An optical notching or filtering system in which a beam of optical radiation is passed through the optical filtering means a multiplicity of times. The optical filtering means has an optical Fourier transform means, a spatial filter, optical inverse Fourier transform means, and a reflector array. After an input optical signal beam undergoes a filtering pass by being directed through the transform means, the filter, and the inverse transform means, the reflector array re-introduces the beam for a multiplicity of subsequent filtering passes. Four embodiments of the system of the invention having various configurations of the reflector arrays for use with one- and two-dimensional spatial filters are disclosed. The various embodiments are set forth as being used in a heterodyning optical notching filter system.

27 Claims, 8 Drawing Figures

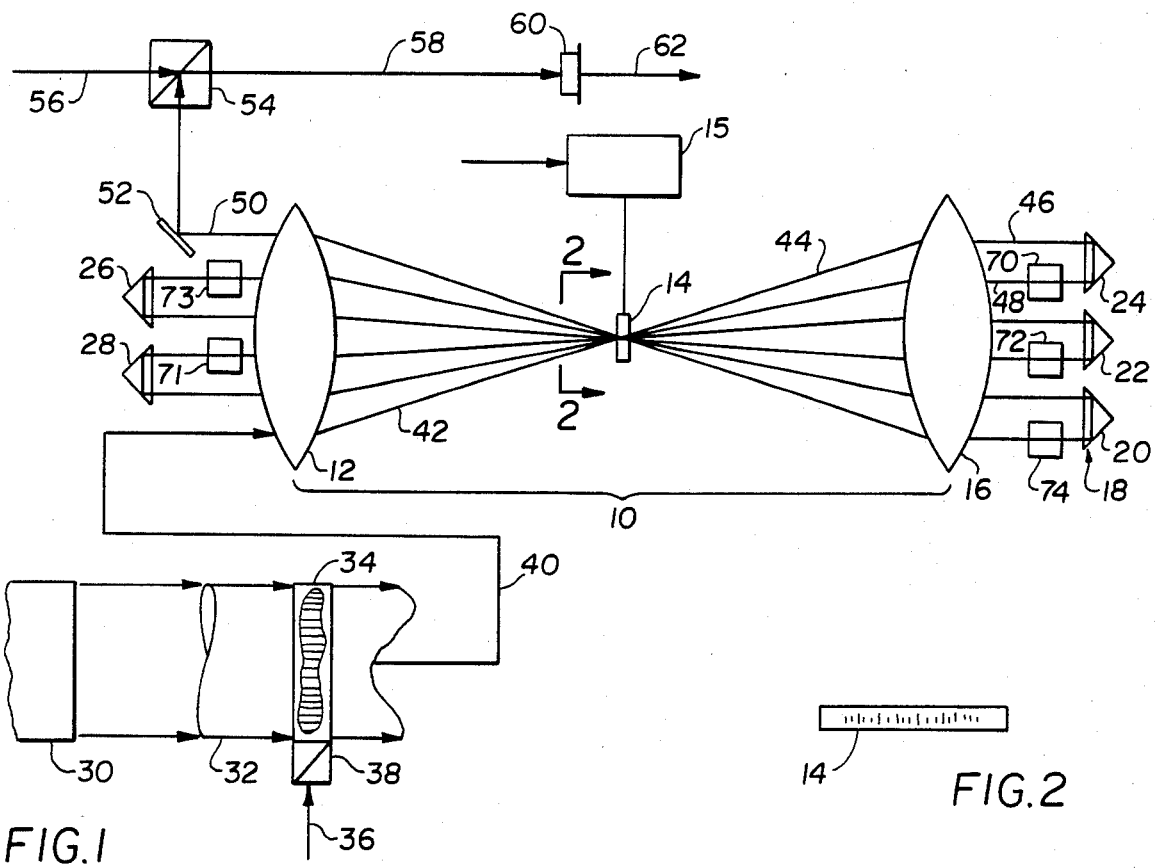
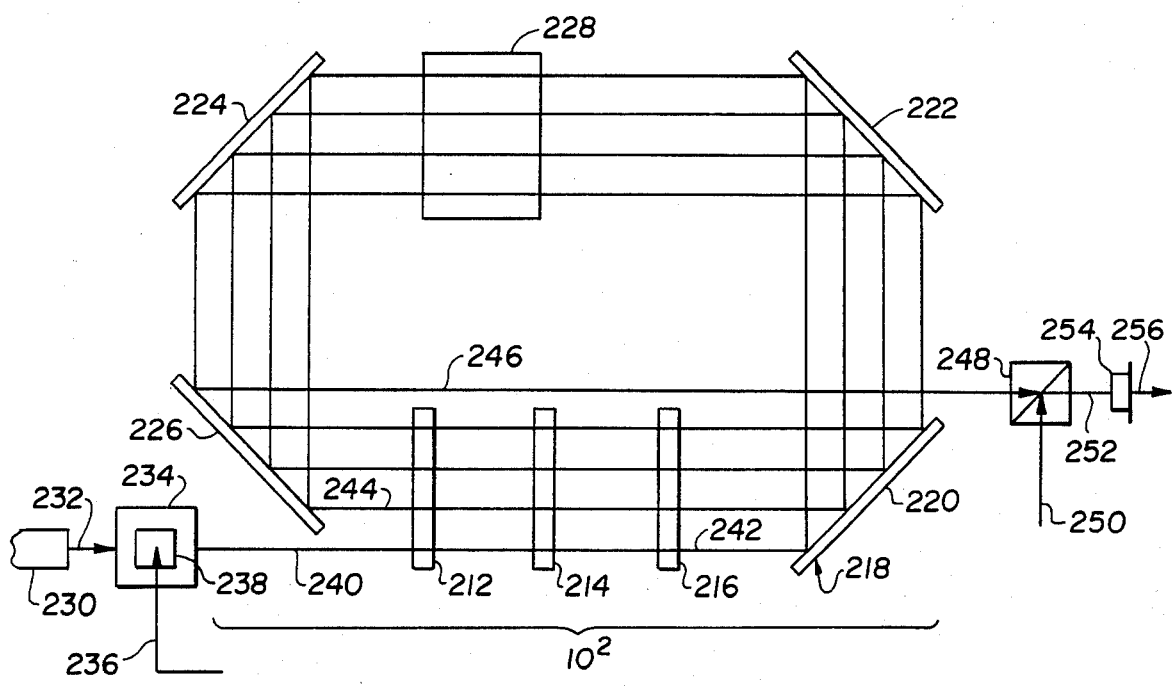

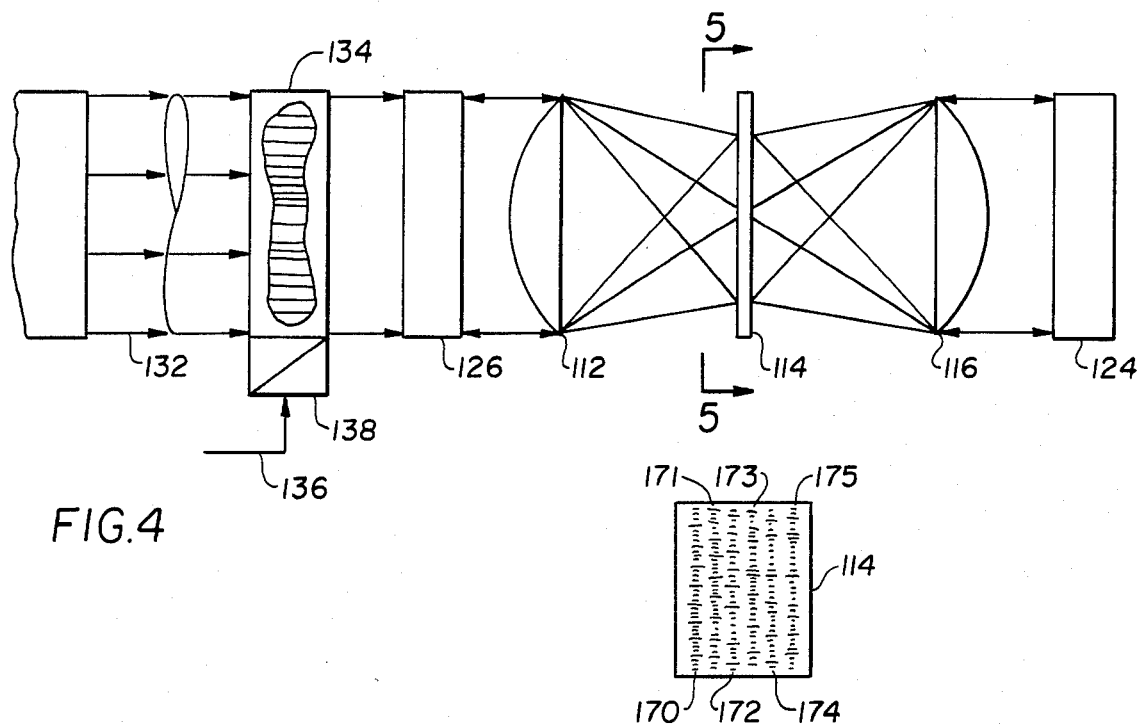
FIG.4
FIG.5
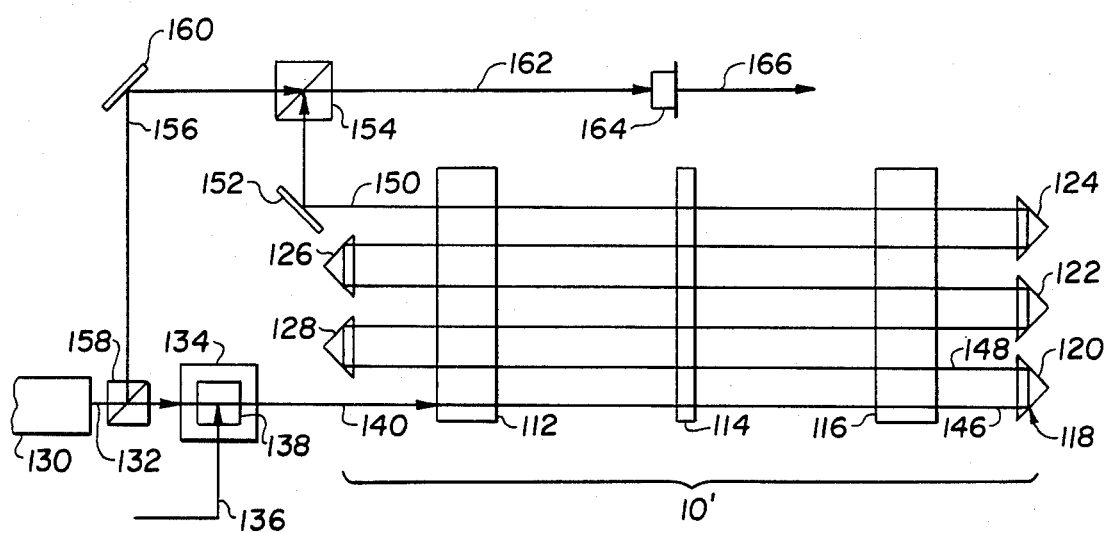
FIG.3

RECURSIVE OPTICAL FILTER SYSTEM

BACKGROUND OF THE INVENTION

1. Field of The Invention

This invention relates to optical information processing and, more particularly, to recursive filter means for use in an optical spatial filter system.

2. Discussion Of The Prior Art

It is known in the prior art to use an optical spatial filter and Fourier transform system to perform selective spatial frequency filtering. Such systems usually incorporate a source of collimated coherent light and, in the light path therefrom, modulation is introduced by means of a suitable transducer, which is followed by a convex lens, an optical spatial filter, which can be a programmable spatial filter (PSF), a second convex lens, and detection means. In such a system, light from the source passing through the transducer is modulated and thus forms a diffraction pattern (Fourier transform) at the back focal plane of the first lens. The second lens provides the inverse Fourier transform of the diffraction pattern that passes through the spatial filter, resulting in a spatial-frequency filtered representation of the modulated input light signal. This light signal exiting the second lens contains all the spatial frequencies appearing in the Fourier plane minus those selectively filtered out by the PSF. Thus, the prior art teaches that changing the spatial frequency distribution of the PSF in the Fourier plane results in an inverse transform image with a corresponding resolution/high frequency, contrast/low spatial frequency and phase response.

Adaptive filtering or the electronically programming of a filter in accordance with time varying criteria has been addressed in the prior art. The concept of a filter matched to the spectrum of the desired signal theoretically provides the optimum filtering. In actual (real world) situations, particularly when spread spectrum signals contaminated with higher level narrow band signals are to be detected, a narrow band (notch) filter within the passband of the wide band spread spectrum signal is desired to reduce or eliminated the high level signal.

There are significant advantages to accomplishing this filtering function optically instead of by use of the more usual electronic filter, particularly if a number of filters are desired. The use of optical techniques for high speed adaptive filtering and reconstruction of broadband RF signals is taught in the prior art, for example, by John N. Lee et al in a IEEE Ultrasonics Conference (1981) paper entitled "High-Speed Adaptive Filtering and Reconstruction Of Broad-Band Signals Using Acousto-Optic Techniques", and further in the following:

T. M. Turpin, "Spectrum Analysis Using Optical Processing", Proceedings of the IEEE, Vol. 69, No. 1, Jan. 1981.

W. T. Phodes, "Acousto-Optic Signal Processing: Convolution And Correlation", Proceedings of IEEE, Vol. 69, No. 1 Jan. 1981.

A. Korpel, "Acousto-Optics-A Review Of Fundamentals", Proceedings of IEEE, Vol. 69, No. 1, Jan., 1981. All of these prior art teachings of optical spatial filtering are seen to be directed to a single stage filtering system. In these prior art systems, particularly those using a PSF, the maximum filter attenuation is about 25 dB, which is the maximum attenuation realizable with presently available components with a single stage PSF.

In the present invention, since the PSF stages are effectively cascaded by means of recursions, the attenuation can be increased as a function of the number of stages (recursions). The prior art, however, is devoid of any teaching of other than single stage spatial filtering means.

SUMMARY OF THE INVENTION

This invention is an optical filtering system in which a beam of coherent collimated optical radiation is passed through the optical filtering means a multiplicity of times before being extracted for utilization. The optical filtering means comprises means for making an optical Fourier transform of the input beam, an optical filter through which the transformed beam is passed, means for making an inverse optical Fourier transform of the filtered beam, and means for passing the filtered beam recursively back through the filtering means. Suitably, the means for making the optical transforms are lens systems and the filter is a spatial filter, preferably of the programmable type. An array of reflectors or refractors are arranged to pass the beam exiting from the optical filtering means back therethrough to obtain the desired number of filtering passes. Optical inverting means can be incorporated into the system to invert the beam as required.

Recursive filtering results in improved attenuation of the undesired portion of a signal being processed. Compared to electronic filter stages where one filter stage must be provided for each resolution element m for a total of n×m electronic filters, where n is the number of filter stages per resolution element; e.g., 6–10, and m the resolution ($1 \leq m \leq 200a$), a maximum of 2000 electronic filters can be obtained with a single optical filtering system with a resolution of 200 using this invention. In this invention, the attenuation of unwanted frequencies is multiplied by a factor determined by the number of recursions n. Results obtained from a single spatial filter and transform lens pair are effectively the same as cascading the filtering system n times when allowance is made for diffraction effects and other system artifacts.

In a preferred embodiment, the recursive filtering means is disclosed as being incorporated in an optical filtering system for RF signals. In that embodiment, the RF input signals are fed into an acousto-optic modulator to modulate a laser beam. The modulated output beam is passed through an optical Fourier transform lens to produce a spatial frequency distribution at its back focal plane. This signal contains a one-for-one spatial and temporal correspondence with the RF frequency distribution. The transformed beam is then directed through the spatial filter which is also located at the back focal plane of the transform lens. (If a PSF is used for the filtering function, optical transmission from point-to-point is controlled by the PSF such that it is possible to block some spatial frequencies and to pass others in accordance with the programmed notch frequencies.) Optical spatial frequencies passing through the spatial filter, consist of the laser optical carrier frequency modulated with the RF frequency. An optical inverse Fourier transform lens images the filtered beam and this output is directed by the recursive reflector array and an inverting prism back through the transform lens, the spatial filter and the inverse transform means a multiplicity of times. This recursively filtered beam is then passed to an optical mixing means where it is mixed with a local oscillator reference beam. Optically combining the modulated laser beam with the local oscillator beam and impinging the sum on a square-law photodetector results in the generation of the difference frequency by a heterodyning action. The electrical output of the photodetector is amplified and initially filtered and then subjected to conventional post processing.

It is thus a principal object of the invention to provide means in an optical system for recursively passing a signal beam a multiplicity of times through a single optical spatial filter such that the attenuation of unwanted signal frequencies is multiplied.

It is a further object of the invention to provide an optical system for effectively cascading the spatial filtering stages in a single compact closed-loop recursive stage.

It is another object of the invention to provide an optical system for the adaptive noise filtering of RF spectra.

Other objects and advantages will become apparent from a reading of the specification and a study of the accompanying drawings.

DESCRIPTION OF THE DRAWINGS

For the purpose of illustrating the invention, there is shown in the drawings the forms which are presently preferred; however, it should be understood that the invention is not necessarily limited to the precise arrangements and instrumentalities here shown.

FIG. 1 is a schematic side view of the recursive optical filter of the invention incorporated in a heterodyning optical notching filter system;

FIG. 2 is a schematic view of the one-dimensional spatial filter embodied in the apparatus of FIG. 1;

FIG. 3 is a schematic side view of another embodiment of the recursive optical filter of the invention incorporated in a heterodyning optical notching filter system;

FIG. 4 is a schematic top view of the recursive optical filter of FIG. 3;

FIG. 5 is a schematic view of the two-dimensional spatial filter embodied in the apparatus of FIGS. 3 and 4;

FIG. 6 is a schematic side view of yet another embodiment of the recursive optical filter of the invention incorporated in a heterodyning optical notching filter system;

DESCRIPTION OF THE PREFERRED EMBODIMENTS

Figure 7:
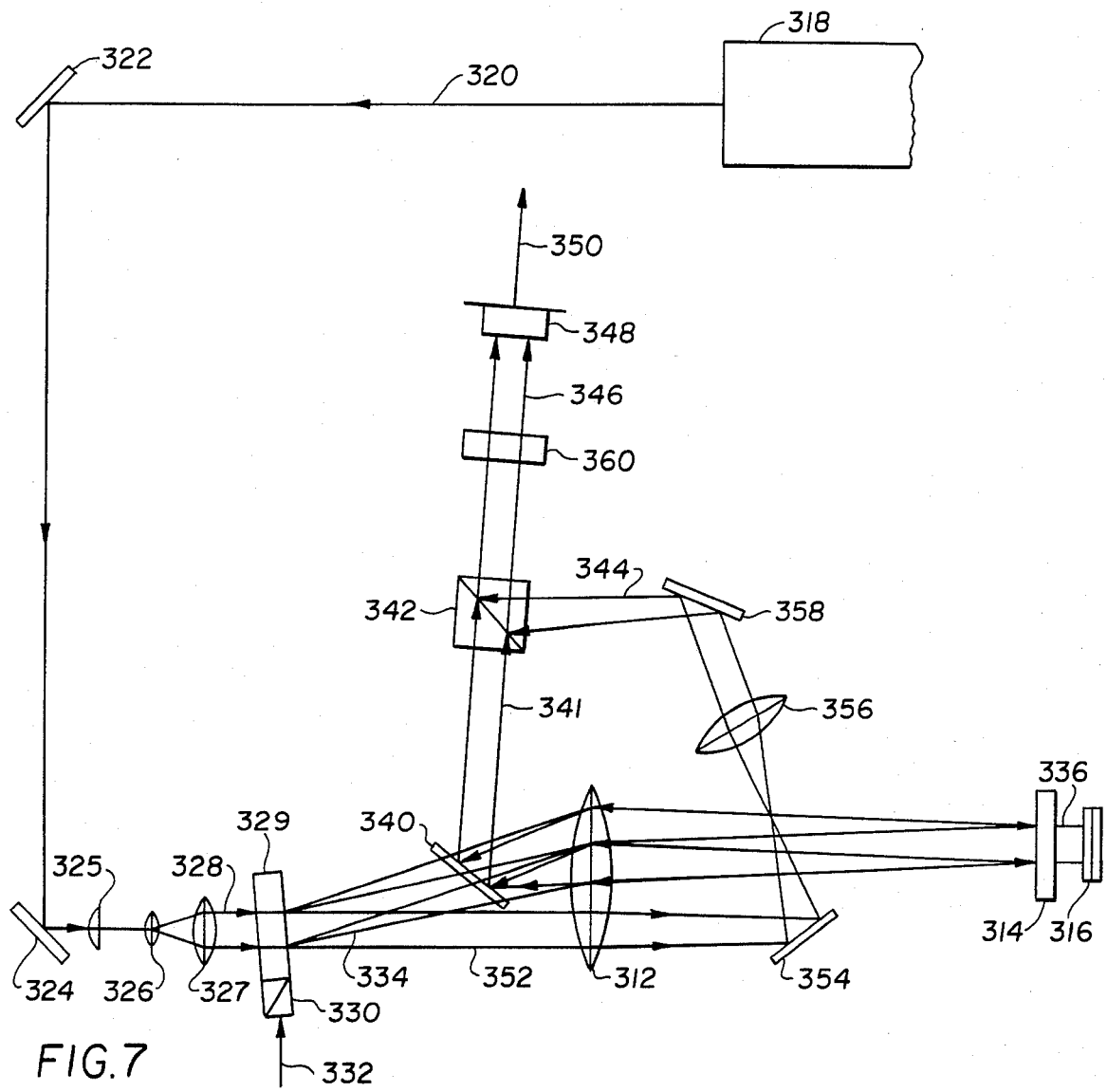
FIG. 7 is a schematic top view of a further embodiment of the recursive optical filter of the invention incorporated in a heterodyning optical notching filter system.

With reference now to the drawings, FIG. 1 shows the recursive optical filter system 10 incorporated in a heterodyning optical one-dimensional notching filter system. It will be understood, of course, that although the recursive system of the invention is described in this and following embodiments as being used with heterodyning filter systems, such use is not to be construed as a limitation thereto. Referring to FIG. 2, recursive filter system 10 comprises an optical Fourier transform means 12, a spatial filter 14, an optical inverse Fourier transform means 16, and an array 18 of reflectors 20–28 with associated inverting prisms 70–74 positioned in a parallel arrangement facing the filter 14 on either side thereof. Double-convex lenses 12 and 16 are shown for producing the transform and the inverse transform of the optical signal, but other known transform producing means such as holographic lenses or the like can be used alternatively. Also, known means such as a programmable spatial filter (PSF), a coded wave plate, or a photographic transparency, for example, can be used as a spatial filter. Should spatial filter 14 be of the programmable type, filter activation electronics 15 such as those taught in the aforementioned John N. Lee etal., IEEE Ultrasonics Conference paper would be used to program the spatial filter. Retroreflective cubes 20–28 are shown for the reflector array 18 but corner reflectors or other suitable reflecting means might be used instead.

The heterodyning system embodied in FIG. 1 comprises a light source 30 such as a laser producing a beam 32 of radiation which is directed through modulating means for impressing spectral and/or temporal signal intelligence on the radiation beam passing therethrough. Preferably, source 30 provides a beam of collimated, substantially coherent radiation. An acousto-optic modulator 34 such as the known Bragg Cell or the like is used to impress the signal intelligence on the radiation beam 32. A suitable input 36 such as RF signals in a passband of interest are impressed on modulator 34 by means of an appropriate transducer 38. The modulated output beam 40 from the modulator 34 is then introduced into filter system 10. As shown, beam 40 is transformed by lens 12 and the transformed signal 42 is passed through the spatial filter 14 where unwanted frequencies are filtered out to produce a spatially filtered RF modulated optical output 44 which passes through lens 16 and produces an inverse Fourier transformed beam 46. This beam 46 is retroreflected by retroreflector 24, passes through inverting prism 70, and the reversed output beam 48 therefrom is passed through lens 16, spatial filter 14, lens 12, and after being reflected by retroreflector 28, passes through inverting prism 71, and back through the Fourier optics again. After successive retroreflections by retroflector 22, 26, and 20 and consequent passes through the filter optics (n recursions for n-1 retroreflectors) the output beam 50 therefrom is directed by a reflector 52 into an optical summer such as a beam combiner cube 54. Attenuation of unwanted frequencies by recursive filtering is a multiple of a factor determined by the optical resolution of the system. When diffraction effects and other system artifacts are accounted for, the results from a single spatial filter and lens pair using the recursive means of our invention are effectively the same as cascading the filtering system n times. In the FIG. 1 embodiment, the signal beam undergoes six filtering passes in recursive filtering system 10. Since the signal beam being filtered experiences only one-dimensional transformation for recursive filtering and, since the optics of the FIG. 1 embodiment of the invention pass the beam through the spatial filter (see FIG. 2) along a single plane, a one-dimensional spatial filter is used. After the signal beam passes through the spatial filter, its optical spatial frequencies are minus those components which were blocked by the filter. The beam spectrum thus consists of the laser frequency optical carrier with a RF modulation.

Output beam 50 from the recursive filtering system 10 is combined in the optical combiner means 54 with a local oscillator reference beam 56 and the output 58 therefrom is introduced into a suitable square-law photodetector 60 where the RF difference frequency is generated. The electrical output 62 from the detector is filtered and is otherwise processed conventionally for utilization.

With reference now to FIGS. 3 and 4 which show another embodiment 10' of the recursive optical filter of the invention incorporated in a heterodyning optical two-dimensional notching filter system. Recursive filter system 10' comprises an optical Fourier transform means 112, a spatial filter 114, an optical inverse Fourier transform means 116, and an array 118 of retroreflectors 120–128 positioned in a parallel arrangement facing the filter 114 on either side thereof. In this embodiment, cylinder lenses are used for the transform means 112 and 116. Cylinder lenses produce one-dimensional transformations during recursive filtering, with elements 120–128 providing displacement for operation with the two-dimensional spatial filter (see FIG. 5). It should be noted that inverting prisms are not used as in the FIG. 1 system 10 since inversion is accomplished by the alternating adjacent element rows 170–175 of the two-dimensional spatial filter.

In the operation of the heterodyning system of FIGS. 3 and 4, a source 130 produces a beam 132 of collimated coherent radiation which is directed through an acousto-optic modulator 134. An RF input signal 136 drives a transducer 138 operating the modulator 134 to impress a RF signal modulation on the output beam 140 exiting the modulator. Beam 140 is introduced into the recursive filter system 10' where it is transformed by lens 112 and after passing through element row 170 of spatial filter 114, is directed through lens 116 where it undergoes an inverse Fourier transformation. Output beam 146 exiting lens 116 is retroreflected by retroreflector 120 and the reversed output beam 148 therefrom repasses through transform lens 116 to the alternate reversed element row 171 of spatial filter 114, transform lens 112, and is reflected by retroreflector 128 back through the filter optics again. After successive retroreflections by retroreflector 122, 126, and 124 (n recursions for n-1 retroreflectors) and consequent passes through the filter optics, the filtered output beam 150 therefrom is directed by a reflector 152 into an optical combiner 154 where it is combined with a local oscillator reference beam 156. As is well known, reference beam 156 can be a beam split off from input beam 132 by a suitable beamsplitter 158 and directed into the combiner 154 by a reflector 160. Output beam 162 from the combiner is introduced into a square-low photodetector 164 which by heterodyning produces an electrical output 166 which is filtered and otherwise processed conventionally for use.

In the apparatus of the invention embodied in FIGS. 3 and 4, the signal beam being processed undergoes six filtering passes in recursive filtering system 10'. It will be appreciated, however, that the number of filtering passes experienced in the various embodiments of the invention will vary with the number of retroreflectors used to obtain the filtering passes of the signal beam and can vary from those shown. In this embodiment, a two-dimensional spatial filter is used to advantageously shape the filter response both in transmission and by alternate inversions of element rows as the signal beam transformations occur during the course of recursive filtering.

Turning now to FIG. 6 illustrating a further embodiment $10^2$ of the recursive optical filter of the invention incorporated in a heterodyning optical two-dimensional notching filter system. As in the embodiments previously discussed, recursive filter system $10^2$ comprises an optical Fourier transform means 212, a spatial filter 214, and an optical inverse Fourier transform means 216, and a closed-loop array 218 of reflectors 220–226, and if required, optical inverting means such as an inverting prism 228. As in the FIGS. 3 and 4 embodiment, cylinder lenses are used for the transform means 212 and 216 and the signal beam experiences only one-dimensional transformations during recursive filtering. The two-dimensional spatial filter is used advantageously as in system 10' to shape the filter response and perform alternate inversions of the element rows.

In the operation of the heterodyning system of FIG. 6, a source 230 produces a beam 232 of collimated coherent radiation which is directed through an acousto-optic modulator 234. An RF input signal 236 drives a transducer 238 operating the modulator 234 to impress an RF signal modulation on the output beam 240 exiting the modulator. Beam 240 is introduced into the recursive filter system $10^2$ where it is transformed one-dimensionally by cylinder lens 212 and, after passing through spatial filter 214, is directed through lens 216 where it undergoes an inverse optical Fourier transformation. Output beam 242 exiting lens 216 is reflected by reflectors 220, 222, 224, and 226 of the array 218 in a closed-loop pattern and is re-introduced into the filter optics as beam 244. Inverting prism 228 placed in the optical path between the reflectors 222 and 224 inverts the beam reflected from reflector 222. After the requisite filtering passes through the filtering system, the beam is directed by reflector 226 out of the filtering system as output beam 246 into optical combining means 248 where it is combined with a local oscillator beam 250. The output beam 252 therefrom, is introduced into a suitable square-law photodetector 254, where the RF difference frequency is generated as an electrical output 256, which is filtered and otherwise processed conventionally for utilization. In FIG. 6, the signal beam is depicted as undergoing four filtering passes.

It may be stated that with the filtering system of our invention, that repeated filtering passes with the same spatial filter (or with the same filter configuration if the spatial filter is of a programmable type) results in high resolution and filtering registration accuracy with extremely high notching attenuation. In the recursive filters of the invention, the transit time for each recursion n is, $$\text{transit time} = 4f\left(\frac{1}{V_L}\right) n$$

where f=lens focal length, and $V_L$=speed of light.

If the recursive filtering system of the invention is being used with a programmable spatial filter and if it is desired to reprogram the filter for subsequent optical paths while not affecting the path currently in use, the embodiment illustrated in FIGS. 3 and 4 is particularly advantageous for ultra high speed signal processing ($\approx 10^{-9}$ sec) as accomplished with a Kerr Cell light switch. This also is the case if preconceived sequential filtering is desired because smooth transitions from one filter configuration to another is provided. Also, if it is desired to program advantageous filter variations in the different filter paths.

In the FIG. 6 embodiment, the reflector array 218 is positioned to form optical loops whereby the system flexibility is greatly increased. Additional access to the optical path provides the option for performing further independent signal processing operations. It is possible to select the number of recursive filtering passes by controlling the signal beam size, divergence, dispersion, scattering, and spatial filter loss. To reduce the attenuation of the system, the inverting prism 228 can be removed and the spatial filter rows alternated to correspond to the inverting of the spatial frequency distribution, or a double pass can be made for each filtration. However, in some systems applications such as where the filtering of both upper and lower side bands is required, the inversion of spatial frequencies may be desirable.

Figure 8:
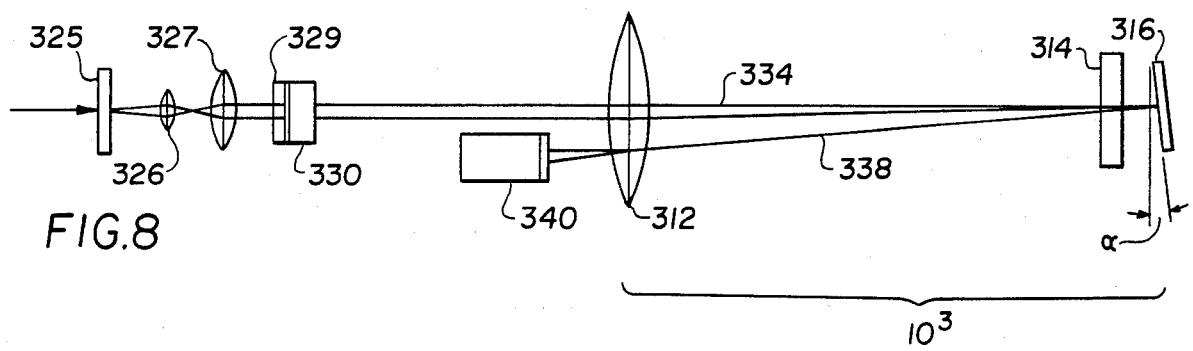
FIG. 8 is a schematic side view of the recursive optical filter of FIG. 7.

A further embodiment $10^3$ of the recursive optical filter of our invention incorporated in a heterodyning optical notching filter system is illustrated in FIGS. 7 and 8. This embodiment is a double recursive system in which both the optical Fourier transforms and the inverse optical transform of the signal beam is accomplished by a single lens. Thus, recursive filter system $10^3$ comprises an optical Fourier transform means, which can be a double-convex lens 312, a programmable spatial filter 314, and a reflector such as a plane mirror 316.

In the operation of the heterodyning system of FIGS. 7 and 8, a radiation source such as a laser 318 produces a beam 320 of collimated coherent radiation which, after being directed by mirrors 322 and 324, is expanded by suitable beam expanding optics such as cylinder lens 325 and double convex lens 326 and is passed through collinating lens 327. The output beam 328 from collimating lens 327 is a sheet beam whose width as indicated in FIG. 7 is substantially greater than its thickness as indicated in FIG. 8. Sheet beam 328 is passed through an acousto-optic modulator 329 where a transducer 330 driven by an RF input signal 332 operates the modulator such that an RF signal modulation is impressed on the output beam 334 exiting the modulator. Beam 334 is transformed by lens 312, resulting in a spatial distribution of the frequency components impressed by the RF modulating signal at the Fourier plane at the spatial filter 314 which filters out the unwanted frequencies. The filtered beam 336 from the spatial filter is reflected by the reflector 316 and the reflected beam 338 (see FIG. 8) passes back through the spatial filter 314 where it is refiltered and directed back through lens 312 where it undergoes an inverse optical Fourier transformation. A mirror 340 directs the inversely transformed beam 341 into optical combining means 342. Mirror 316 is positioned at a suitable angle α and mirror 340 is offset accordingly such that reflected beam 338 and the inversely transformed beam 341 travels an optical path that avoids interference with input beam 334. In the combining means, the signal beam 341 is mixed with a local oscillator beam 344 and the output beam 346 therefrom is introduced into a square-law photodetector 348 where the RF difference frequency is generated as an electrical output 350, which is filtered and otherwise processed conventionally for utilization. The two-pass embodiment of the recursive optical filter of our invention provides for a minimum number of components in a compact economical design using only a single Fourier lens and making use of the off-axis zero under term of the input beam for the local oscillator. This design is particularly advantageous where two filter recursions are sufficient for the application. If the requirements so dictate, an appropriate analyzer 360 can be incorporated into the system. Suitable analyzers can be incorporated into the other embodiments if required.

Local oscillator beam 344 is derived from the on-axis zero order term 352 of the output beam exiting the acousto-optic modulator 329. Thus, output beam 334 described previously hereinabove would actually be the off-axis first order term of the beam exiting the modulator 329. This can be the arrangement used also in the other embodiments of the invention and the zero order term exiting the acousto-optic modulator can be used advantageously as the local oscillator beam, or the zero order term can be removed with a zero order block in the Fourier plane. In the FIG. 7 embodiment, the zero order term or beam 352 is passed through lens 312 and is directed by a mirror 354 through lens 356 and is reflected by a mirror 358 as the local oscillator beam 344 into combining means 342.

Although shown and described in what are believed to be the most practical and preferred embodiments, it is apparent that departures from the specific methods and designs described and shown will suggest themselves to those skilled in the art and may be made without departing from the spirit and scope of the invention. We, therefore, do not wish to restrict ourselves to the particular constructions described and illustrated, but desire to avail ourselves of all modifications that may fall within the scope of the appended claims.

Having thus described our invention, what we claim is:

1. A recursive optical filter system comprising: a source which produces a substantially coherent, collimated beam of optical radiation; optical filtering means including means for producing an optical Fourier transform, an optical filter, and means for producing an optical inverse Fourier transform; recursive means for directing said beam in a manner to traverse said optical filtering means a plurality of times, and means for extracting said beam for utilization, the recursive passage of said beam through said filtering means resulting in an efficient attenuation of unwanted spectral components of said beam.

2. The system as described in claim 1 wherein the beam of optical radiation is modulated with RF spectra and wherein the optical filter is a programmable spatial filter which filters out unwanted frequencies.

3. The system as described in claim 1 wherein the means for producing the optical Fourier transform and the optical inverse Fourier transform are lens systems.

4. The system as described in claim 1 wherein the means for directing the beam recursively through the optical filtering means is an arrangement of reflectors.

5. The system as described in claim 1 wherein spectral signals are imposed on the beam from said radiation source.

6. The system as described in claim 1 wherein the recursive means for passing the radiation beam successively through the optical filtering means comprises a first set of reflectors arranged parallel to and facing a second set of reflectors with said optical filtering means interposed therebetween such that an input beam of said radiation passing through said filtering means is redirected by a reflector in said first set back through said filtering means and is re-directed back therethrough by a reflector in said second set whereby said radiation beam is passed through said filtering means a multiplicity of times, said reflectors of each of said sets being positioned such that said beam on each successive pass through said filtering means is offset relative to the preceding pass so that parallel transits of the beam results.

7. The system as described in claim 6 wherein the reflectors re-direct an incident beam thereon 180°.

8. The system as described in claim 6 wherein the reflectors are retroreflecting cubes.

9. The system as described in claim 6 wherein the reflectors are elongated rectangular pyramidal prisms with the apexes thereof lying parallel with one another and with the bases thereof facing inwardly in the direction of the optical filtering means, and wherein said base is transparent to the radiation beam and the inside surface of the sides of said prism are reflective to said beam such that said beam incident on said prism base near one of its elongated edges is reflected by said prism inside surfaces of the sides of said prism to emerge from said base near the other of its elongated edges in a direction opposite said incident beam.

10. The system as described in claim 9 wherein the faces of the pyramidal prisms are at a 45° angle to the base thereof.

11. The system as described in claim 6 wherein the optical filter of the filtering means is a two-dimensional filter.

12. The system as described in claim 6 wherein the means for producing an optical Fourier transform is a cylinder convex-plano lens and the means for producing an inverse optical Fourier transform is a cylinder plano-convex lens and wherein said plano sides of said lenses are on the side facing the optical filter.

13. The system as described in claim 1 wherein the recursive means for passing the radiation beam successively through the optical filtering means comprises a first array of reflectors arranged parallel to and facing a second array of reflectors with said optical filtering means interposed therebetween such that an input beam of said radiation is directed through a linear region of the optical filter of said filtering means and is re-directed back and forth successively through the same said linear region of said optical filter by said first and second arrays of reflectors.

14. The system as described in claim 13 wherein the reflectors re-direct a beam incident thereon through a 180 degree directional change.

15. The system as described in claim 13 wherein the reflectors are retroreflectors.

16. The system as described in claim 13 wherein the reflectors are elongated rectangular pyramidal prisms with the apexes thereof lying parallel with one another and with the bases thereof facing inwardly in the direction of the optical filtering means, and wherein said base is transparent to the radiation beam and the inside surfaces of the sides of said prism are reflective to said beam such that said beam incident on said prism base near one of its elongated edges is reflected by said prism inside surfaces to emerge from said base near the other of its elongated edges in a direction opposite said incident beam.

17. The system as described in claim 16 wherein the faces of the pyramidal prisms are at a 45° angle to the base thereof.

18. The system as described in claim 13 wherein the optical filter of the filtering means is a one-dimensional filter.

19. The system as described in claim 13 wherein the means for producing an optical Fourier transform and an inverse optical Fourier transform are cylinder double-convex lenses.

20. A recursive optical filter for RF signals comprising: an RF signal source: a source which produces a substantially coherent, collimated beam of optical radiation; an acousto-optic modulator excited by a transducer driven by RF signals from said RF source; an optical filtering means including means for producing an optical Fourier transform, an optical filter, and means for producing an inverse optical Fourier transform; optical recursive directing means associated with said optical filtering means, whereby RF signals from said RF signal source drive said acousto-optic modulator to impress the RF spectra on an optical radiation beam directed therethrough from said radiation source, the modulated beam from said modulator being re-directed through said optical filtering means a plural number of times by said recursive directing means such that the optical beam exiting from said optical filtering means carries a spatially filtered RF modulation.

21. The recursive optical filter as described in claim 20 wherein said recursive optical filter also comprises an optical local oscillator, an optical beam combiner, detecting means for converting an optical signal into an electrical signal, and an electronic bandpass filter, and wherein the output beam from said optical filtering means is combined by said beam combiner with a beam from said local oscillator to produce a summed output which is incident on said detecting means whose electrical output is filtered by said bandpass filter to produce down-converted RF spectra.

22. The system as described in claim 1 wherein the recursive means for passing the radiation beam successively through the optical filtering means comprises a substantially closed loop arrangement of reflectors such that said beam is re-directed through said filtering means a multiplicity of times and wherein the signal beam size, divergence, dispersion, scattering, and spatial filter loss are controlled such that said beam on each of its recursions through said filtering means is offset so that parallel transits of the beam results.

23. The system as described in claim 22 wherein the recursive means comprises a first reflector positioned at an angle of 45° to the incident beam from the optical filtering means, a second reflector positioned at an angle of 45° to the output beam from said first reflector, a third reflector positioned at an angle of 45° to the output beam from said second reflector, a fourth reflector positioned at an angle of 45° to the output beam from said third reflector, the output beam from said fourth reflector being directed such that at least most of the recursions thereof pass through said optical filtering means.

24. The system as described in claim 23 wherein inverting means are positioned in the path of the successive beams between the second and the third reflectors to optically invert said beams.

25. The system as described in claim 24 wherein the optical inverting means is an inverting prism.

26. The system as described in claim 22 wherein the optical filter of the optical filtering means is a two-dimensional filter.

27. The system as described in claim 22 wherein the means for producing an optical Fourier transform is a cylinder convex-plano lens and the means for producing an inverse optical Fourier transform is a cylinder plano-convex lens and wherein said plano sides of said lenses are on the side facing the optical filter.

* * * * *